United States Patent

[11] 3,603,649

[72] Inventor Alexander J. Wilson
Warwickshire, England
[21] Appl. No. 856,982
[22] Filed Sept. 11, 1969
[45] Patented Sept. 7, 1971
[73] Assignee Girling Limited
Tyseley, England
[32] Priority Sept. 11, 1968
[33] Great Britain
[31] 43124/68

[54] HYDRAULIC BRAKING SYSTEMS FOR VEHICLES
19 Claims, 7 Drawing Figs.
[52] U.S. Cl. .................................................. 303/21 F,
188/181 A, 303/10, 303/21 CG, 303/61
[51] Int. Cl. .................................................. B60t 8/12,
B60t 13/14
[50] Field of Search.......................................... 188/181;
303/6, 10, 21, 24, 61–63, 68–69

[56] References Cited
UNITED STATES PATENTS
| | | | |
|---|---|---|---|
| 3,286,734 | 11/1966 | Hartshorne.................... | 303/21 X |
| 3,401,982 | 9/1968 | Walker et al. ................. | 303/21 |
| 3,514,161 | 5/1970 | Frayer........................... | 303/21 |

*Primary Examiner*—Milton Buchler
*Assistant Examiner*—John J. McLaughlin
*Attorney*—Imirie and Smiley ABSTRACT: A control unit for a vehicle-braking system comprises a housing incorporating a bore in which works a piston or plunger which, when subjected at one end to fluid pressure from a master cylinder, is movable in the bore in one direction to close a first valve controlling communication between the bore and a return line to the high-pressure source and open a second valve to permit high-pressure fluid from a high-pressure source to pass to a slave cylinder of a wheel brake through an outlet connection in the housing. The unit also incorporates an antiskid device operative to move the piston or plunger in a reverse direction to close the second valve and open the first valve when the deceleration of the braked wheel exceeds a predetermined value.

PATENTED SEP 7 1971 3,603,649
SHEET 1 OF 3
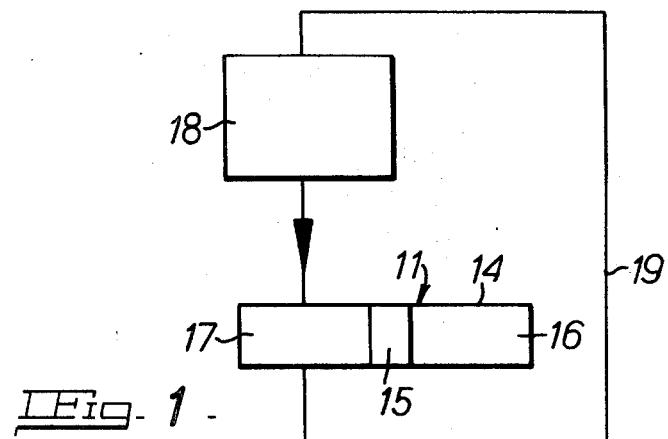
Fig. 1.
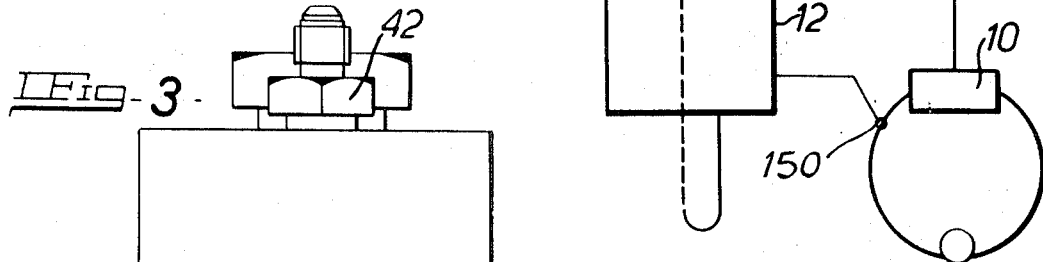
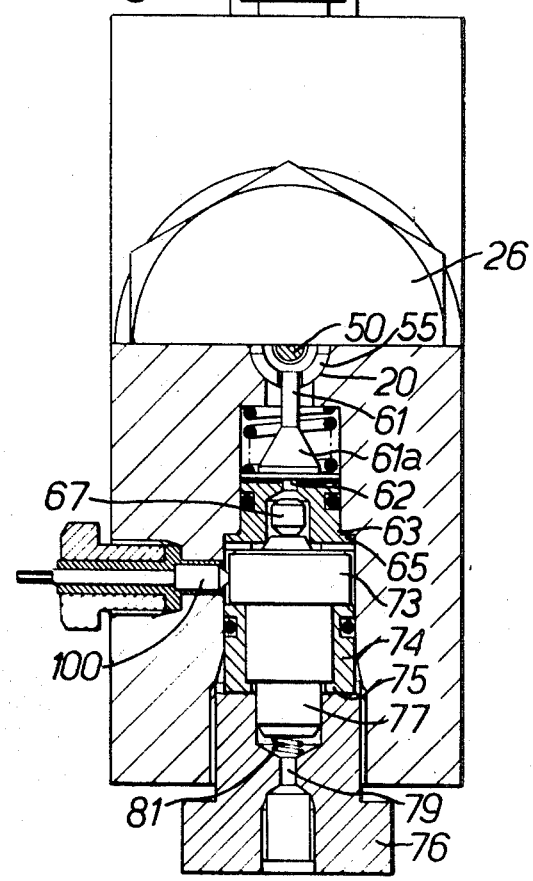
Fig. 3.
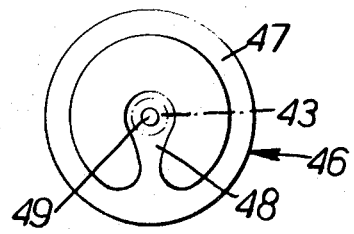
Fig. 4.

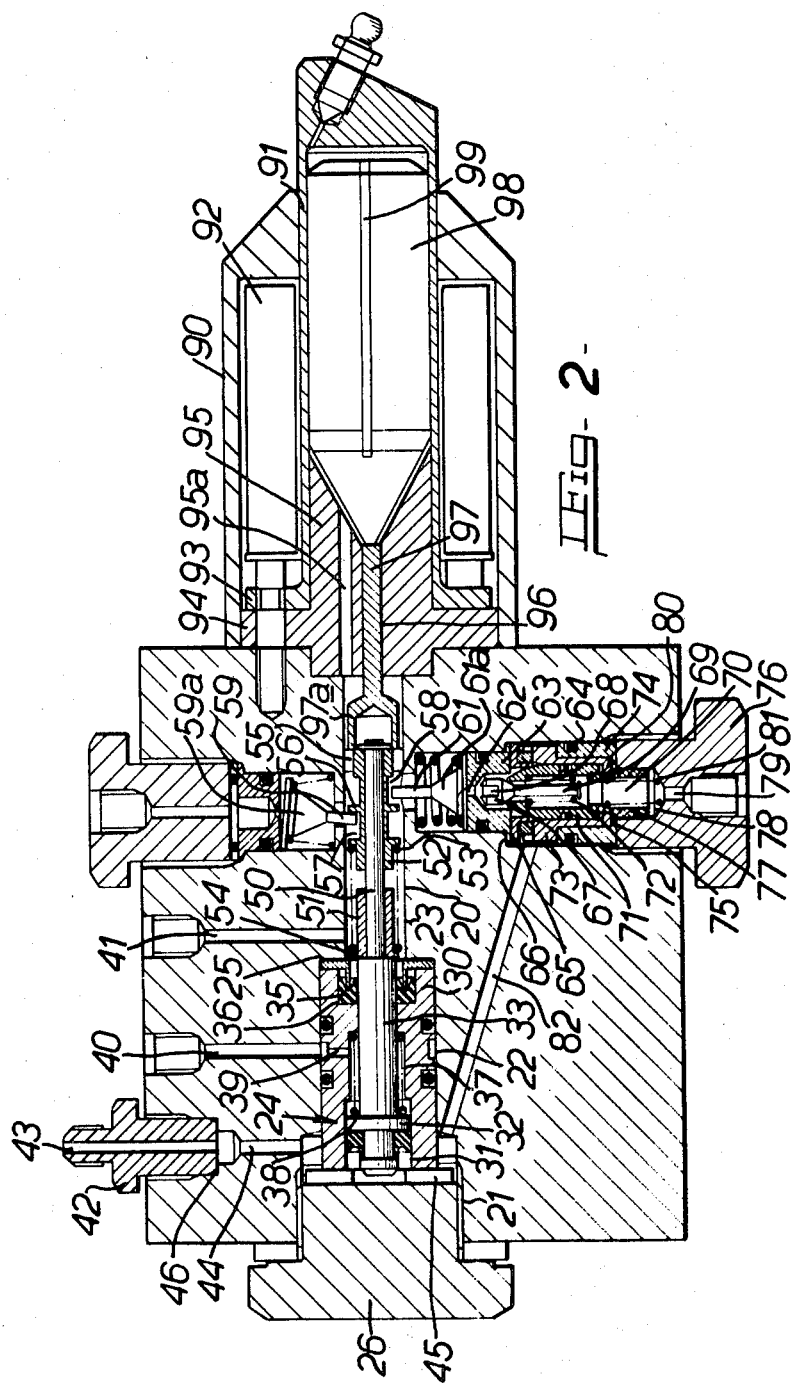

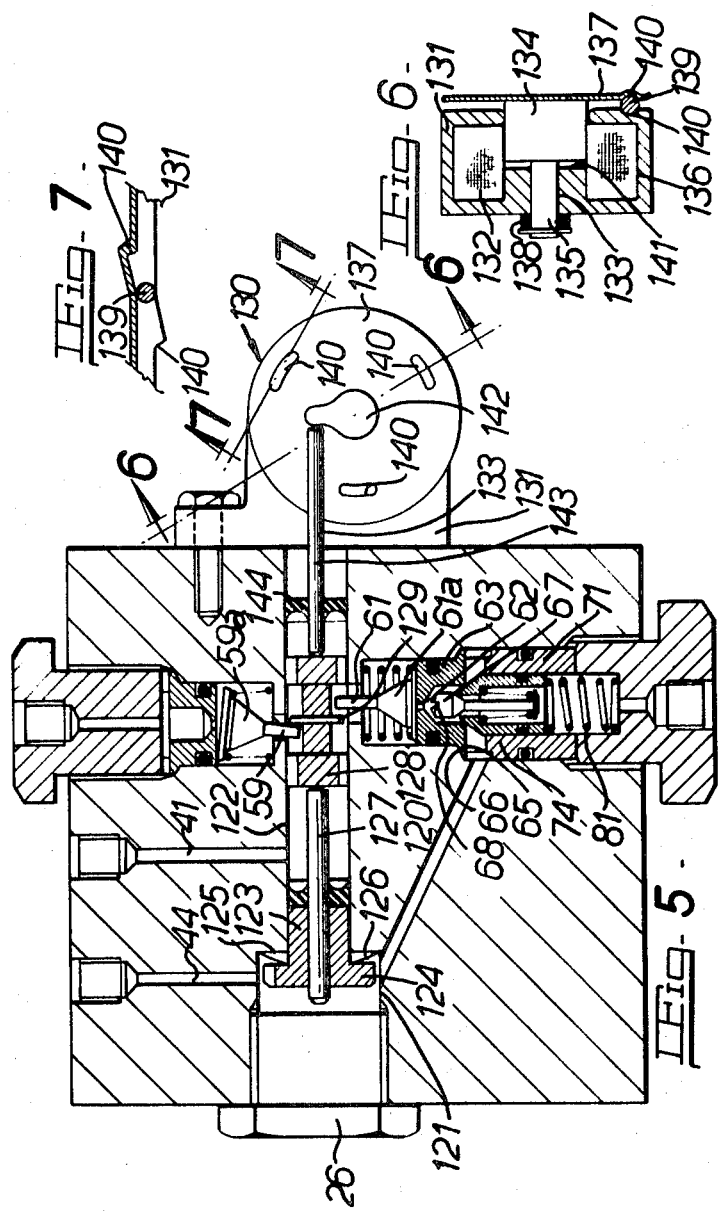

HYDRAULIC BRAKING SYSTEMS FOR VEHICLES

This invention relates to hydraulic braking systems for vehicles of the kind in which a slave cylinder for applying the brakes on at least one wheel of a vehicle is supplied with fluid under pressure from a high-pressure source through a control unit.

According to our invention a control unit for an hydraulic braking system of the kind set forth comprises a housing incorporating a bore in which is located an axially movable piston or plunger, a first valve controlling communication between the bore and a first passage for connection to a return line to a reservoir, a second valve controlling communication between the bore and a second passage for connection to the high-pressure source, and an outlet connection leading from the bore for connection to a slave cylinder to apply the brakes on at least one wheel of the vehicle, the arrangement being such that upon operation of the means for moving the piston or plunger axially the piston or plunger is moved in the bore in one direction to close the first valve and open the second valve to permit high-pressure fluid to be supplied to the outlet connection, in which the unit incorporates an antiskid device for sensing deceleration of the braked wheel which is adapted to move the piston or plunger in a reverse direction to close the second valve and open the first valve when the deceleration of the braked wheel exceeds a predetermined value. Preferably the means for moving the piston or plunger axially in the bore comprises fluid pressure supplied from a master cylinder to the end of the bore remote from the antiskid device through a third passage in the housing.

In one construction the antiskid device comprises a solenoid-operated core which is movable in the said reverse direction in response to a signal from an electrical pickup device sensing the deceleration of the braked wheel.

In other construction the antiskid device incorporates a cam which is angularly movable to apply a thrust to the piston or plunger upon energization of a solenoid in response to a signal from an electrical pickup device sensing the deceleration of the braked wheel. The cam is angularly movable upon angular movement of a disc relative to a stationary housing due to the camming action of balls adapted to engage in complementary inclined recesses in the disc and in the adjacent end of the housing.

A bypass passage provided in the housing of the control unit controls the inlet from the third passage to a position on the downstream side of the second valve whereby, upon failure of the high-pressure source, the master cylinder pressure is delivered to the slave cylinder through the second valve.

The bypass passage is normally closed by a third valve which opens automatically upon failure of the high-pressure source and when subjected to master cylinder pressure.

In one construction opening of the third valve is effective to render the antiskid device inoperative.

A vehicle-braking system in accordance with our invention is illustrated in the accompanying drawings in which:

FIG. 1 is a layout of the braking system;

FIG. 2 is a longitudinal section through a control unit for incorporation in the layout of FIG. 1;

FIG. 3 is a transverse half section through the valve assembly controlling the supply of pressure fluid from a high-pressure source in the control unit of FIG. 2;

FIG. 4 is a plan on an enlarged scale of a restrictor valve incorporated in the inlet line to the control unit of FIGS. 2 and 3;

FIG. 5 is a longitudinal section through a modified control unit for incorporation in the layout of FIG. 1;

FIG. 6 is a section on the line 6—6 of FIG. 5; and

FIG. 7 is a part section on the line 7—7 of FIG. 5.

In the layout illustrated in FIG. 1, a slave cylinder 10 of a wheel brake is supplied with hydraulic fluid under pressure from a high-pressure source, in the form of an hydraulic accumulator 11, through a control unit 12, upon operation of a pedal-operated master cylinder 13 which supplies an actuating fluid pressure to the control unit 12.

The hydraulic accumulator 11 comprises a cylindrical body 14 in which works a floating piston 15 dividing the body 14 into a compartment 16 containing a gas under pressure to apply pressure to a compartment 17 containing hydraulic fluid. The compartment 17 is connected between a supply line from a high-pressure pump 18 and an inlet connection in the control unit 12. When the brakes are in the off position, hydraulic fluid is returned to a tank or reservoir feeding the pump 18 from an outlet port in the control unit 12 and through a return pipeline 19.

The control unit 12 is shown in detail in FIGS. 2–4 and comprises a body provided with a through bore 20 which is stepped at spaced points to provide three sections 21, 22, 23 of different diameters. A sleeve assembly 24 located in the middle section 22 of the bore 20, which is of intermediate diameter, extends at its outer end into the section 21 of greater diameter. The inner end of the sleeve assembly 24 is held against a shoulder 25 at the step in the bore, between the intermediate section 22 and the section 23 of smallest diameter, by a plug 26 screwed into the section 21 of greatest diameter and engaging with the outer end of the sleeve assembly 24.

The sleeve assembly 24 comprises a sleeve 30 having a stepped through bore of which the portion 31 of larger diameter is located adjacent to the plug 26. A piston 32 working in the portion 31 of the bore 20 is carried by a rod 33, which with the piston forms a differential piston assembly working through the portion 23 of the bore 20 of smaller diameter and an annular seal 35 housed in a recess 36 in the inner end of the sleeve. The portion 31 of the sleeve 30 at its innermost end leads into an axial recess 37 in which is located a spring 38 urging the piston 32 towards the plug 26.

The sleeve 30 is provided with a radial port 39 which is located between a pair of annular sealing rings in the sleeve and which provides communication between a passage 40 in the body leading to atmosphere, and the recess 37, and seals the port 39 from the ingress of the hydraulic fluid.

A further passage 41 in the body adapted to be connected to the slave cylinders of the brakes of the vehicle opens in the section 23 of the bore 20 in the body.

A union 42 screwed into a threaded recess in the body 10 and adapted to be connected to the pedal operated master cylinder 13 is provided with an axial bore 43 communicating with the section 21 of the bore 20 through a passage 44 in the body. The inner end of the plug 26 is provided with at least one slot 45 so that the master cylinder pressure can act on the outer end of the piston 32. A plate valve 46, FIG. 4, located between the inner end of the union 42 and the body comprises an annular ring 47 having an inwardly extending resilient tongue 48 provided with an opening 49 which is smaller in diameter than that of the axial bore 43 in the union. The plate valve acts as a one-way valve to allow fluid from the master cylinder to flow past it, and restricts the return flow of fluid to the master cylinder in the opposite direction through the opening 49.

The piston rod 33 is provided with an integral extension 50 of reduced diameter which extends for a substantial distance into the smallest diameter portion 23 of the bore 20. A pair of collars 51 and 52 mounted on the extension 50 are urged away from each other by a strong spring 53 and engage, respectively, between a shoulder 54 at the step in diameter between the piston rod 33 and the extension 50, and an abutment collar 55 carried by the free end of the extension 50.

The collar 52 is provided on opposite sides of a radial flange 56 with a pair of annular grooves 57 and 58. The stem 59 of a spring loaded tipping valve 59a, controlling return flow of hydraulic fluid to the tank or reservoir supplying the pump 18, extends into the smallest diameter section 23 of the bore 20 and is received in the annular groove 57 on the side of the flange 56 adjacent to the piston rod 33. The stem 61 of a spring loaded tipping valve 61a extends into the section 23 of the bore 20 and is received in the annular groove 58 on the other side of the flange remote from the piston rod 33.

The tipping valve 61a controls the flow of high-pressure fluid from the hydraulic accumulator 11 into the section 23 of the bore 20 through a port 62 in the inner closed end of a sleeve 63 housed in a stepped bore 64 in the body of the control unit. The sleeve 63 is located in the portion of the bore 64 of smaller diameter and has a radial flange 65 engaging against a shoulder 66 at the step in diameter of the bore 63. The inner face of the closed inner end of the sleeve 63 surrounding the port 62 is of conical shape forming a seating for the outer face of a head 67 of a check valve which is provided with a transverse slot 68. The valve head 67 is carried by a valve stem 69 which is received in a central longitudinal bore 70 of a sleeve 71 having a conically shaped inner end, and the inner face of the valve head 67 is normally urged into engagement with the adjacent end of the conical sleeve 71 by a spring 72 acting between the end of the stem 69 remote from the head 67 and a shoulder adjacent to the inner end of the sleeve 71.

The conical end of the sleeve 71 is normally engaged with the adjacent end of the sleeve 63 at the edge surrounding the bore of that sleeve.

The conical sleeve 71 works in a central bore of a stepped sleeve 73 of which the innermost end of greatest diameter is spaced from the radial flange 65 and is of less diameter than that of the maximum diameter of the stepped bore 64. The portion of the stepped sleeve 73 of smallest diameter is received in a further sleeve 74 which is in sealing engagement with the wall of the stepped bore 64 in the portion of greatest diameter, and the outermost end of the sleeve 74 is formed with an inwardly extending lip or rim 75 forming an abutment for the outer end of the stepped sleeve 73. The sleeve 74 is held in position by a plug 76 screwed in to the stepped bore 64, and an extension sleeve 77 received at its inner end in a central bore at the outer end of the conical sleeve 71 is housed in an axial recess 78 in the plug 76 which communicates with a central passage 79 through which fluid under pressure from the hydraulic accumulator 11 flows into the interior of the sleeves 71 and 72, and which is of slightly greater length than that of the extension sleeve 77 which it encloses. The extension sleeve 77 is formed with an external shoulder 80 normally urged into abutment with a radial lip or rim on the outer end of the sleeve 73 by means of a compression spring 81. The sleeve 71 and the extension sleeve 77 are constructed from an electrically nonconductive material.

An inclined drilling 82 provides a connection between the section 21 of the through bore 20 and the portion of the stepped bore 64 of greatest diameter between the sleeves 63 and 73.

An antiskid control device is connected to the end of the body remote from the plug 26, and comprises an outer shell or casing 90 enclosing nonmagnetic inner sleeve 91 which is closed at its outer end and which is surrounded by windings 92. The inner sleeve 91 is provided at its inner end with an outwardly directed radial flange 93 bolted to the body through openings in a radial flange 94 of an auxiliary body member 95 which is received in the inner end of the sleeve 91. The auxiliary body member 95 is provided with a central through bore 96 through which extends an extension rod 97 connected to a core piece 98 working in the inner sleeve 91. The inner end of the extension rod 97 is provided with an open ended recessed head 97a of an internal diameter sufficient to receive the outer end of the extension 50 of the piston rod 33. Normally the head 97a is spaced from the abutment collar 55 at the outer end of the extension 50 and a gap is provided between the core piece 98 and the adjacent end of the auxiliary body member 95.

A plurality of channels 99 are provided in the core piece 98 to permit liquid to flow between opposite ends of the sleeve 91, and at least one axially extending passage 95a provides communication between the inner end of the sleeve 98 and the stepped bore 20.

The wheels of the vehicle of which the brakes are connected to the connection 41, or the axle on which these wheels are mounted, are provided with electrical pickup devices 150 which sense the deceleration of each wheel or of the wheels mounted on the axle. The signal is amplified by an amplifier of which the output is connected to the windings 92 of the antiskid control device.

In the inoperative position the control unit is in the position shown in the drawings with the tipping valve 59a held in an open position by the cooperation with it of the flange 56 of the collar 52, so that the stepped bore 20 in the body is in free communication with the tank or reservoir supplying the pump 18. The flange 56 is spaced from the stem 61 of the tipping valve 61a so that the tipping valve 62 is held in a closed position to close the port 62 by the effect of its spring loading opposing the pressure of the high-pressure fluid delivered from the hydraulic accumulator 14 to the interior of the conical sleeve 71. The pressure of the fluid is, however, sufficient to hold the valve head 67 away from the conical sleeve 71 against the loading in the spring 72, but the conical sleeve 71 remains in engagement with the lower end of the sleeve 63 due to the difference in areas between that portion which is subjected to the high-pressure fluid from the hydraulic accumulator 14, and the portion exposed to the pressure from the master cylinder 13 in the portion of the stepped bore 64 of greater diameter.

In the normal operation of the brakes, which are connected to the outlet passage 41, upon actuation of the pedal-operated master cylinder 13, fluid under pressure is delivered to the section 21 of the stepped bore 20. The master cylinder pressure acts on the outer end of the piston 32 to move the assembly comprising the piston 32, piston rod 33, and the extension 50 in the stepped bore 20 in a direction away from the plug 26. Since the force in the spring 53 is stronger than the master cylinder pressure, the collars 51 and 52 remain as a solid assembly and move with the extension 50 in a fixed spaced relationship. This has the effect of allowing the flange 55 to move out of engagement with the stem of the tipping valve 59 so that this valve closes under the effect of its spring loading to cut off communication with the tank or reservoir. Further movement of the piston 32 causes the flange 55 to engage the stem of the tipping valve 61 and open this valve to allow fluid under pressure from the hydraulic accumulator 11 to flow through the slot 68 in the check valve 67 and through port 62 and into the stepped bore 20, from whence it flows to the slave cylinders of the brakes through the passage 41.

The high-pressure fluid in the section 23 of the stepped bore 20 reacts on the ed of the piston rod 33 to oppose the force applied to the piston 32 by the pressure from the master cylinder 13. This causes the piston 32 to travel in a reverse direction to force fluid back to the master cylinder, and the reverse flow of fluid to the master cylinder 13 is resisted by the opening 49 in the plate valve 46 which acts as a restrictor to prevent oscillation of the differential piston assembly 32, 33 occuring.

The reverse flow of fluid continues until a balanced condition is reached in which the differential piston 32 assumes a position in which both tipping valves 59 and 61 close due to the action of their spring forces.

When the rate of deceleration of the braked wheel or wheels sensed by the electrical pickup devices attains a predetermined value the output from the amplifier is sufficient to energize the windings 92 of the antiskid control device. The core piece 98 is advanced and the head 97a of the extension 97 engages with the abutment collar 55 to move it and the collar 52 relative to the extension 50 towards the plug 26, compressing the spring 53. This axial movement of the collar 52 causes the flange 56 to engage the stem of the tipping valve 59 which is opened to release the braking pressure by placing the stepped bore 20 in communication with the tank or reservoir. As soon as the braking pressure is relieved, the differential piston assembly 32, 33, under the influence of the master cylinder pressure, moves in a direction away from the plug 26 until the collars 51 and 52 abut each other.

As soon as the wheel or wheels are restored to their normal speed of rotation, the energizing current to the windings 92 is cut off and the spring 53 is effective to move the collars away from each other to close the tipping valve 59 and open the tipping valve 62 so that the brakes are reapplied in the sequence described above.

When the master cylinder pressure is relieved at the termination of a braking operation the unit is restored to the inoperative position described above, and high-pressure fluid is prevented from returning to the hydraulic accumulator 11 by operation of the check valve 67.

In the event of failure of the high-pressure source, such as upon failure of the high-pressure pump 18, the hydraulic accumulator 11, or a break in a pipeline between the pump or the accumulator, or between the accumulator or the passage 79, the master cylinder pressure in that portion of the stepped bore 64 of greatest diameter acts on the conical sleeve 71 to move it out of engagement with sleeve 63. Since the stepped sleeve 73 in which the conical sleeve 71 works is in contact with electrical brush gear 100 controlling operation of the antiskid device, as the conical sleeve 71 is moved downwardly away from its engagement with the sleeve 63, the contact with the electrical brush gear 100 is broken to render the antiskid device inoperable. Simultaneously, the master cylinder pressure is applied to the wheel brake through the port 62 and the stepped bore 20, and high-pressure fluid from the master cylinder 13 is prevented from returning to the hydraulic accumulator 11 by the action of the check valve 67.

In the modified control unit 12 as illustrated in FIGS. 4 to 7 of the accompanying drawings, corresponding reference numerals have been used to indicate corresponding parts. The unit illustrated in FIGS. 4 to 7 is provided with a stepped through bore 120 including a portion 121 of greater diameter and a portion 122 of smaller diameter.

A piston 123 working in the portion 122 of the bore has an enlarged head 124 located in the portion 121 of greater diameter. Normally the head of the piston 124 is urged away from a shoulder 125 at the step in diameter of the bore 120 by a Belleville or other spring washer 126 acting between the head and the shoulder. A plunger 127 working through an axial bore in the piston 123 is adapted to engage at its innermost end with a floating piston in the form of a spool 128 working in the portion 122 of the bore. The spool 128 is provided at an intermediate point in its length with a radial flange 129 located between and adapted to engage alternatively with, the stem 59, 61 respectively of the spring loaded tipping valve 59a and 61a controlling, respectively, the return to the tank or reservoir and the port 62 through which high-pressure fluid from the hydraulic accumulator 11 is delivered to the bore 120.

An antiskid device generally indicated by 130 in the form of a rotary solenoid is adapted to be bolted into the end of the unit remote from the plug 26. The antiskid device comprises a nonmagnetic stationary housing 131 housing windings 132 which are connected to the output from the amplifier which receives signals from the electrical pickup devices sensing the deceleration of the braked wheels.

The housing 131 has a central bore 133 which is counterbored to receive a core in the form of a boss 134 having a stem 135 which projects from the outer end of the bore 133. The windings 132 are located with an annular chamber 136 in the housing which is disposed radially outwards from the counterbore. The boss 134 projects from the housing 131 and provides a mounting for a circular disc 137 which is urged towards the housing by a spring 138 located between the housing and the other end of the stem 135.

Three balls 139 are located in cooperating inclined or conical recesses 140 in adjacent faces of the disc 137 and the housing 131 at points spaced angularly on a pitch circle of constant diameter.

The length of the boss 134 and the depth of the counterbore are chosen so that there is an air gap 141 between the inner end of the boss 134 and an adjacent end face of the housing at the base of the counterbore.

A cam 142 rigid with the outer face of the disc 137 is adapted to engage with the outer end of a rod 143 working through a stationary seal 144 in the bore 122 and engaging at its inner end with the adjacent end of the spool 128.

In a normal inoperative position the control unit 12 is in the position shown in the drawings. The antiskid device 130 is in the position shown in FIG. 7 with the inclined recesses 140 in the disc 137 offset circumferentially relative to their complementary recesses in the housing 131 so that the balls are located between the disc 137 and the housing 131 at positions lying closely adjacent to the edges of the inclined recesses.

In the normal operation of the brakes which are connected to the outlet passage 41, upon actuation of the pedal-operated master cylinder 13 fluid under pressure is delivered to the portion 121 of the stepped bore 120. The master cylinder pressure acts on the head 124 of the piston 123 to move it into the bore 120 against the loading on the spring washer 126, and simultaneously the master cylinder pressure acts on the end of the plunger 127 to move it relative to the piston 123 and into the bore 120. Due to the engagement between the plunger 127 and the spool 128, the spool is advanced in the bore to allow the flange 129 to move out of engagement with the stem of the tipping valve 59 so that this valve closes under the effect of its spring loading to cut off communication with the tank or reservoir. Further movement of the spool 128 in the same direction causes the flange 129 to engage the stem 61 of the tipping valve 61 and open this valve to allow fluid under pressure from the hydraulic accumulator 11 to flow through the slot 68 in the check valve 67 and through the port 62 and into the stepped bore 120, from whence it flows to the slave cylinder of the brakes through the passage 41.

The high-pressure fluid in the portion 122 of the stepped bore 120 reacts on the piston 123 to oppose the force applied to the piston by the pressure from the master cylinder 13.

The movement of the piston 124 and of the plunger 127 are subjected to frictional forces due to seal drag. This has the effect that at the low pressures at which the spring 126 can collapse, there is a flow of high-pressure fluid when the reaction reaches a value which causes the plunger 127 to move in a reverse direction. This occurs with inward movement of the piston 123 down to the low pressure associated with the final stages of brake release. For all normal purposes a balanced condition is established in which the pressure in the portion 122 of the bore 120 is regulated to be equal to the pressure in the portion 121 of the bore.

The deceleration of the braked wheels or wheel causes an output from the amplifier at all values of deceleration, but the force produced by the energized windings 132 of the solenoid does not cause a reaction to be transmitted to the spool 128 until the force acting over the area of the rod, which is subjected to brake-pressure fluid, is overcome. Beyond this point the pressure in portion 122 of the bore 120 becomes less than that in the portion 121 in accordance with the attitude of the electrical feedback of deceleration transmitted through the solenoid.

The core piece 134 is then moved axially in the housing to cause the balls 139 to run down into the inclined recesses 140 and move the disc 137 and the cam 142 angularly in a counterclockwise direction, as illustrated in FIG. 5, to apply to the rod 143 a thrust which moves the spool 128 in a reverse direction towards the plug 26.

The flange 129 of the spool 128 engages with the stem of the tipping valve 59a to open that valve and release the braking pressure by placing the stepped bore 120 in communication with the tank or reservoir.

The shape of the inclined recesses 140, involve a choice of slope starting rather steeply and becoming progressively less such that the large variations in tractive force between the poles of the solenoid which occur with change of energization of the poles is greatly reduced.

Since the plunger 127 is also moved in the reverse direction the piston 123 moves automatically in the forward direction into the bore 120 against the loading of the spring washer 126 to compensate for the volume of the entering plunger, and maintain a constant pressure in the portion 121 of the stepped bore.

It is essential that the area of the rod 143 is small when compared with the area of the plunger 127, so making the antiskid device as sensitive as possible. That is to say only a minimum force has to be applied from the cam 142 to the rod 143 to relieve the braking pressure when the rate of deceleration of a braked wheel exceeds a predetermined value. The force required is in excess of the pressure of the master cylinder acting multiplied by the area of the rod 143.

The construction and operation of this embodiment is otherwise substantially the same as that described above with reference to FIGS. 2 and 3.

In a modification, rotation of the disc may be achieved directly by replacing the solenoid 132, 134 with a solenoid of the rotary type, thereby eliminating the provision of the balls 139.

I claim:

1. In a control unit for an hydraulic braking system for a vehicle of the type including a slave cylinder for applying a wheel brake, a source of high-pressure fluid, and means for supplying fluid from said source to said slave cylinder, comprising a housing incorporating a bore, a piston assembly axially movable in said bore, means for moving the piston assembly axially in said bore, a first valve controlling communication between said bore and a first passage in said housing for connection to a return line to a reservoir, a second valve controlling communication between said bore and a second passage for connection to said high-pressure source, and an outlet connection leading from said bore for connection to said slave cylinder to apply said wheel brake, the arrangement being such that upon operation of said means for moving said piston assembly axially, said assembly is moved in said bore in one direction to close said first valve and open said second valve to permit high-pressure fluid to be supplied to said outlet connection, the invention comprising an antiskid device incorporated in said unit for sensing deceleration of said braked wheel, said antiskid device being adapted to move said piston assembly in a reverse direction to close said second valve and open said first valve when the deceleration of said braked wheel exceeds a predetermined value.

2. The invention as claimed in claim 1, wherein said means for moving said piston assembly axially in said bore comprises fluid pressure supplied from a master cylinder to the end of the bore remote from said antiskid device through a third passage in the housing.

3. The invention as claimed in claim 2, wherein a bypass passage in said housing connects the inlet from said second valve whereby, upon failure of the high-pressure source, said master cylinder pressure is delivered to said outlet connection through said second valve.

4. The invention as claimed in claim 3, wherein said bypass passage is normally closed by a third valve which opens automatically upon failure of the high-pressure source and when subjected to master cylinder pressure.

5. The invention as claimed in claim 4, incorporating means actuated by opening of said third valve to render said antiskid device inoperative.

6. The invention as claimed in claim 1, wherein said antiskid device comprises a solenoid-operated core, and an electrical pickup device sensing the deceleration of said baked wheel is adapted to produce a signal to move said core in the said reverse direction when said deceleration exceeds said predetermined value.

7. The invention as claimed in claim 1, wherein said antiskid device comprises an electrical pickup device sensing the deceleration of the braked wheel, a solenoid adapted to be energized in response to a signal received from said pickup device when said deceleration exceeds a predetermined value, and an angularly movable cam adapted to apply a thrust to said piston assembly when said solenoid is energized.

8. The invention as claimed in claim 7, wherein said cam is mounted on a disc, and said disc and an adjacent face of a stationary housing are provided with complementary inclined recesses, balls located in said recesses providing a camming action to move said cam angularly when said disc is moved axially towards said housing on energization of said solenoid.

9. The invention as claimed in claim 1, wherein said first and second valves each comprise a spring loaded tipping valve provided with a stem, and said stem extends into said bore into the path of an abutment movable upon movement of said piston assembly.

10. The invention as claimed in claim 9, wherein said bore in said housing is of stepped form and said piston assembly comprises a differential piston, and an axial extension on said differential piston has an end portion, and wherein a collar mounted on said extension through which projects said end portion carries said abutment, and an extension on the inner end of a core adapted to be operated upon energization of the solenoid of the antiskid device, has an inner end, a recessed head on said inner end of said last mentioned extension being adapted to engage the end of said collar remote from said differential piston.

11. The invention as claimed in claim 9, wherein said piston assembly comprises a plunger working through a sleeve in said bore, and said abutment comprises a radial flange on a spool working in said bore between adjacent ends on said plunger and a rod which is movable axially by said cam of the antiskid device to apply a thrust to the plunger through said spool.

12. A control unit for an hydraulic braking system for a vehicle of the type including a slave cylinder for apply a wheel brake, a source of high-pressure hydraulic fluid, and means for supplying fluid from said source to said slave cylinder, comprising a housing incorporating a first bore and a second bore communicating with said first bore, a piston assembly axially movable in said first bore, a first spring loaded tipping valve controlling communication between said first bore and a first passage in said housing for connection to a return line to a reservoir, a first sleeve housed within said second bore and having a closed inner end provided with a port, a second spring loaded tipping valve controlling communication between said second bore and said first bore through said port, an outlet connection leading from said first bore for connection to said slave cylinder to apply said wheel brake, a third passage communicating with one end of said first bore for connection to a master cylinder, a second sleeve located in said second bore against the end of said first sleeve remote from said second tipping valve, said second sleeve having a central longitudinal bore communicating with said first sleeve for connection to said high-pressure source and a check valve housed within said sleeve, said check valve comprising a head adapted to engage with a seating around said port, and a stem carrying said head and received in said longitudinal bore in said second sleeve, the arrangement being such that when subjected at one end to fluid under pressure through said third passage said piston assembly is movable in the bore in one direction to close said first tipping valve and open said second tipping valve to permit high-pressure fluid to be supplied to said outlet connection, and an antiskid device incorporated in said unit for sensing deceleration of said braked wheel, said antiskid device being adapted to move said piston assembly in a reverse direction to close said second tipping valve and open said first tipping valve when the deceleration of said braked wheel exceeds a predetermined value.

13. A control unit as claimed in claim 12, wherein said seating and said head of said check valve are of complementary conical outline.

14. A control unit as claimed in claim 12, wherein said second sleeve has a conically shaped inner end and a first spring is adapted to urge said inner end in engagement with said adjacent end of first sleeve over an edge surrounding a bore in said first sleeve in which said head of said check valve is received, and wherein a second spring is adapted to urge the end of said head of said check valve remote from said seating into engagement with said inner conical end of said second sleeve.

15. A control unit as claimed in claim 14, wherein said second conical sleeve works in a central bore of a stepped sleeve of which the portion of said stepped sleeve of smaller diameter is received in a further sleeve which is in sealing engagement with a portion of the wall of said second bore in said housing.

16. A control unit as claimed in claim 15, wherein said second bore is a stepped form, and the said further sleeve is located in the portion of said stepped bore of greatest diameter.

17. A control unit as claimed in claim 12, wherein said second bore of stepped form, and said housing of said control unit has an inclined drilling which provides a connection between a portion of the stepped bore of greatest diameter and said third passage for connection to a master cylinder.

18. A control unit as claimed in claim 12, wherein said unit incorporates electrical brush gear and movement of said second sleeve in a direction away from said first sleeve is adapted to break contact with electrical brush gear to render said antiskid device inoperative.

19. In an hydraulic braking system for vehicles having a source of hydraulic fluid under pressure a slave cylinder for applying a wheel brake, and a pedal-operated master cylinder for controlling the supply of pressure fluid from said source to said slave cylinder through said control unit, said control unit comprises a housing incorporating a bore, a piston assembly axially movable in said bore, means for applying fluid pressure from said master cylinder to one end of said piston assembly to cause said assembly to move axially in said bore in one direction, a first valve controlling communication between said bore and a reservoir for said source, a second valve controlling communication between said source and said bore, and outlet connection between said bore and said slave cylinder whereby application of pressure from said master cylinder to said one end of said piston assembly is adapted to move said piston assembly in said one direction to close said first valve and open said second valve to permit high-pressure fluid to be supplied to said slave cylinder through said outlet connection, and said system incorporates an antiskid control device adapted to move said piston assembly in a reverse direction to close said second valve and open said first valve when the deceleration of said braked wheel exceeds a predetermined value.